P. E. STOW.
APPARATUS FOR COLORING FILMS AND THE LIKE.
APPLICATION FILED JAN. 25, 1915.

1,162,886.
Patented Dec. 7, 1915.
4 SHEETS—SHEET 1.

P. E. STOW.
APPARATUS FOR COLORING FILMS AND THE LIKE.
APPLICATION FILED JAN. 25, 1915.

1,162,886.

Patented Dec. 7, 1915.
4 SHEETS—SHEET 4.

UNITED STATES PATENT OFFICE.

PERCIVAL E. STOW, OF CROYDON, ENGLAND, ASSIGNOR OF ONE-THIRD TO HARRY MARTIN VALENTINE SHARP, OF CROYDON, ENGLAND, AND ONE-THIRD TO HENRY VASSAR LAWLEY, OF BATTERSEA PARK, LONDON, ENGLAND.

APPARATUS FOR COLORING FILMS AND THE LIKE.

1,162,886. Specification of Letters Patent. Patented Dec. 7, 1915.

Original application filed November 22, 1913, Serial No. 802,563. Divided and this application filed January 25, 1915. Serial No. 4,346.

*To all whom it may concern:*

Be it known that I, PERCIVAL EDWIN STOW, subject of George V, King of Great Britain and Ireland, and resident of 173 St. James' road, Croydon, in the county of Surrey, England, have invented certain new and useful Improvements in Apparatus for Coloring Films and the like, of which the following is a specification.

This invention relates to apparatus for carrying out the method of coloring films and the like described and claimed in Letters Patent No. 1130645 issued to me on 2nd, March 1915.

The function of the apparatus is to transfer the color from the negative film ("printplate") or the like to the positive film or the like by means of pressure blocks in the manner substantially as hereinafter described.

The apparatus is preferably constructed as illustrated in the accompanying drawings, wherein—

Figure 1:
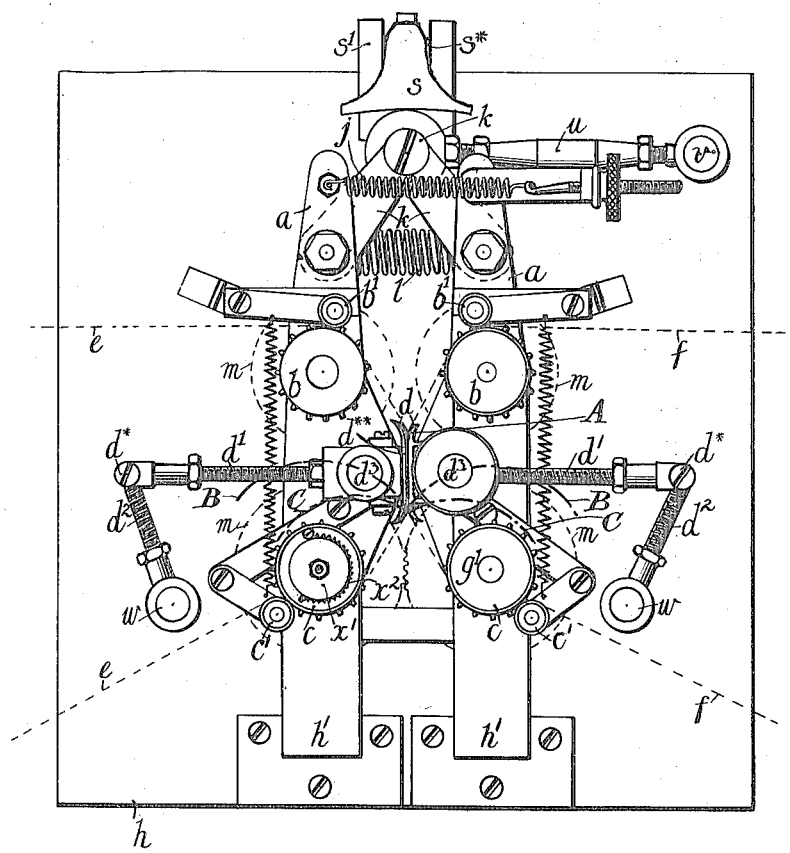
Figure 2:
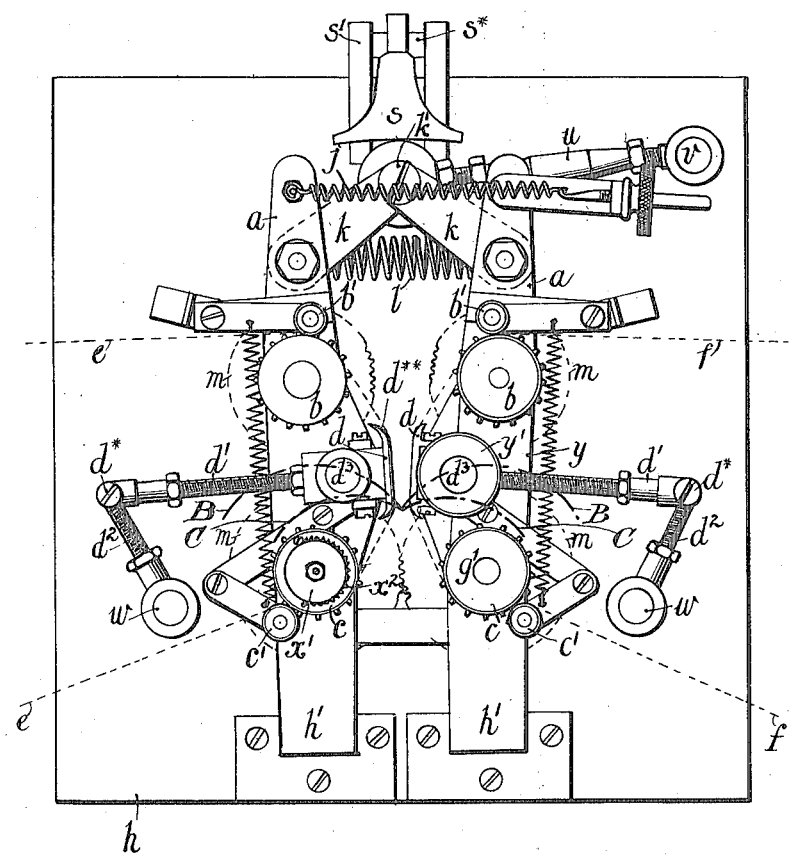
Figure 3:
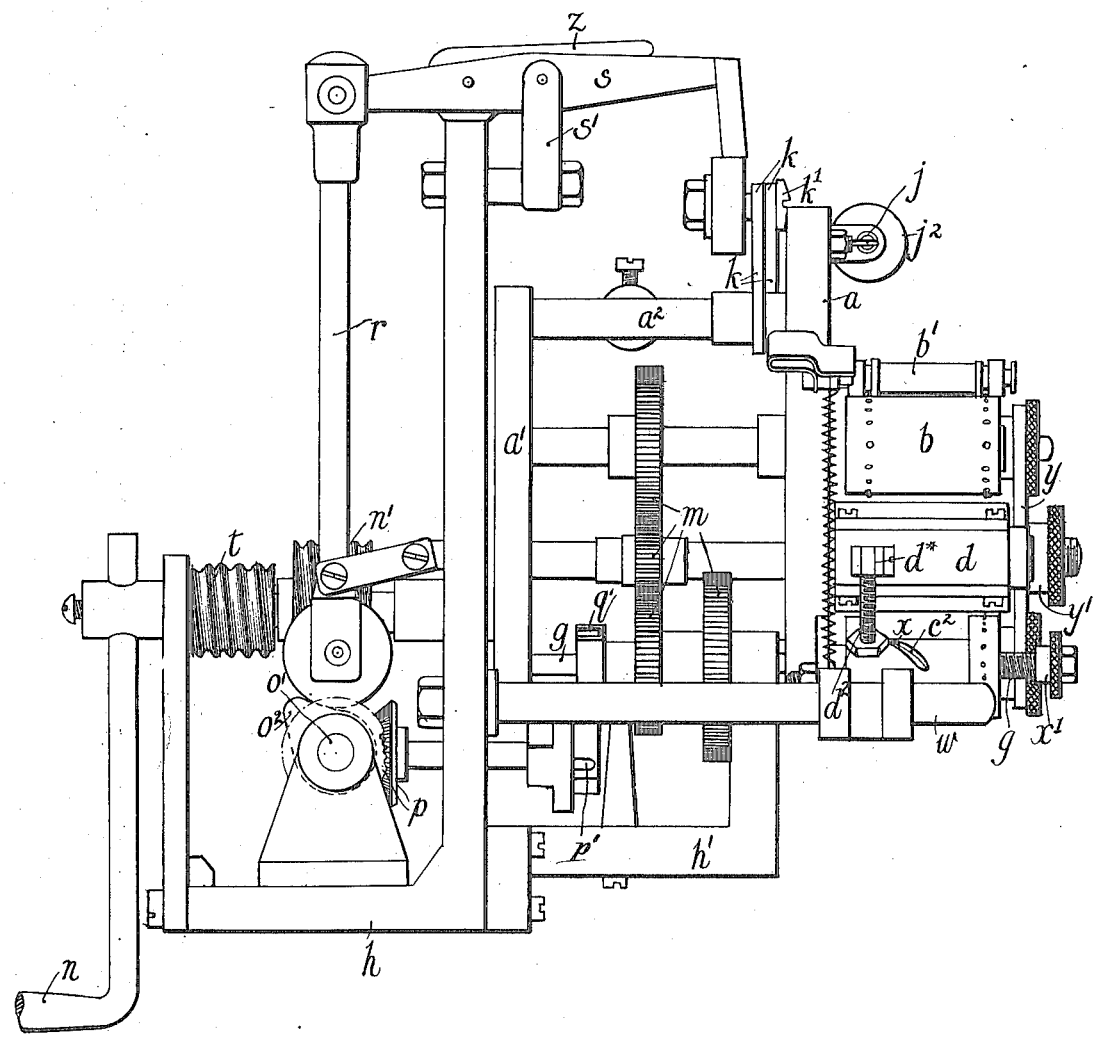

Figure 1 is a front elevation: showing the position occupied by the parts of the apparatus when the positive and the negative (both shown in broken lines) are under pressure between the pressure blocks. Fig. 2 is a similar view to Fig. 1 but shows the position of the parts of the apparatus when the pressure blocks are separated. Fig. 3 is a side elevation and Fig. 4 a plan of the apparatus as shown in Fig. 1, both Figs. 3 and 4 being on a larger scale.

Referring to the drawings, on each of a pair of oppositely disposed arms $a$, $a$, upper and lower sprocket wheels, $b$, $b$, and $c$, $c$, respectively, are rotatably mounted. Pivoted on the said arms between said sprocket wheels are the pressure blocks $d$, $d$. The mutually opposing faces of the pressure blocks are in the form of plates whose upper and lower edges are bent outward away from one another, as shown in Figs. 1 and 2, so as to ease the passage of the films over them, one of them being faced with a felt or the like pad $d^{**}$. In place of each of the pressure blocks a pair of rollers placed one above the other may be employed, the upper one constituting a pressure roller and the lower one a guide roller.

The positive $e$, (uncolored) and the negative $f$, (colored in the manner described in my said patent) are led into the machine over the upper sprocket wheels $b$, $b$, thence face to face between the pressure blocks, and then out of the machine under the lower sprocket wheels $c$, $c$. Spring-controlled pressure rollers $b^1$, $b^1$, and $c^1$, $c^1$, respectively, press the films into contact with the sprocket wheels.

Figure 4:
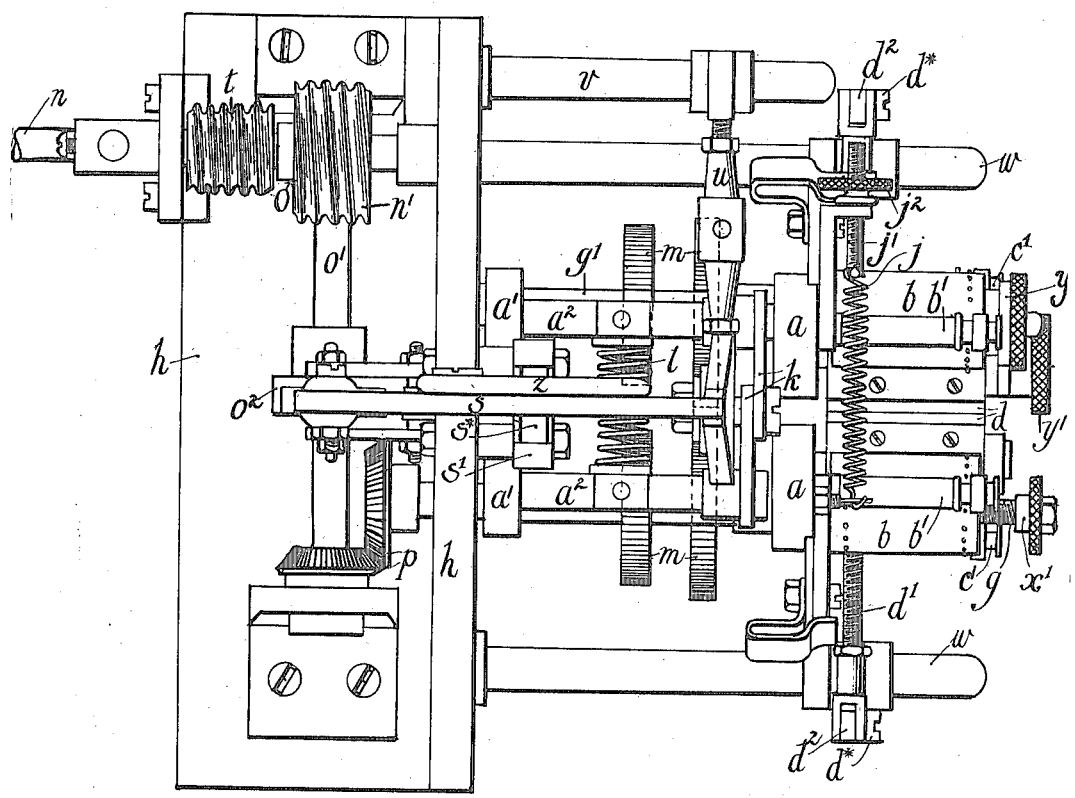

As shown in Figs. 3 and 4, the arms $a$, $a$, are connected to rear arms $a^1$, $a^1$, by means of rods $a^2$, $a^2$, near their upper ends. Through the lower ends of the arms $a$, $a$, $a^1$, $a^1$, shafts $g$, and $g^1$ freely pass. These shafts take a bearing in a plate $h$ and also in brackets $h^1$ fixed in the plate $h$, and the arms $a$, $a$, $a^1$, $a^1$, rock upon them. Thus, the said arms with their rods $a^2$, $a^2$ constitute frames which rock on the shafts $g$, $g^1$. The lower sprocket wheels $c$, $c$, are mounted upon forward extensions of the shafts $g$, $g^1$. The upper end of the two rocking frames are connected together by a spring $j$, in tension, and toggles $k$, the tension of the spring being adjustable by means of a screw $j^1$ and milled head $j^2$. Between the upper ends of the rocking frames is also placed a spring $l$ under compression. By suitably adjusting the tension of the spring $j$ the pressure on the films between the pressure blocks can be regulated with extreme nicety. The sprocket wheels are geared together so as to run all at the same speed by means of gear wheels, $m$, $m$, to which motion is transmitted by means of a handle $n$, worm $n^1$, worm wheel $o$, mounted on a shaft $o^1$, bevel gearing $p$, and Maltese cross $q$. The latter is driven by means of the pin $p^1$ entering the radial slots of which one is shown at $p^1$, of the Maltese cross in the usual way, and is employed for the purpose of imparting the necessary intermittent motion to the films.

The pressure blocks are forced apart at the required time by means of a cam $o^2$, fixed on the shaft $o^1$ and operating on a rod $r$, and lever $s$, which latter is pivoted at $s^*$ in a fixed bracket $s^1$. In the apparatus shown in the drawings the cam $o^2$ operates on the rod $r$ once for every four revolutions of the handle $n$, the speed ratio between the worm $n^1$ and worm wheel $o$ being 4 to 1. When the cam $o^2$ rises, the front end of the lever $s$ depresses the toggles $k$ and thereby forces the arms $a$, $a$, and the pressure blocks, $d$, $d$, etc., apart into the position shown in Fig. 2.

A connecting piece $u$, adjustable in length, is pivoted at its outer end on a fixed pin $v$ and at its inner end on a pin $k^1$ which latter connects the inner ends of the toggles $k$ together. The purpose of such connecting piece is to hold the toggles, rocking frames, etc., in position.

The upper sprocket wheels $b$, $b$, contain springs (not shown) which maintain the films under tension, said springs being connected at one end to said sprockets and at the other end to the shafts on which said sprockets rotate.

In order to obtain the registration of the films when necessary, the following device may be employed. For vertical movement of the positive film $e$ the lower sprocket wheel on the left hand side of the machine is provided with a longitudinal spiral slot $c^2$ (Fig. 3) along which moves a pin $x$ projecting through a longitudinal slot in the shaft $g$. The pin $x$ projects from a rod which is located within the outer end-portion of the shaft $g$ and is attached to a nut $x^1$ screwed on to the outer end of the shaft. Thus by turning the nut $x^1$ the pin $x$ causes the sprocket $c$ to partially rotate and move the film vertically. The slot $c^2$ and pin $x$ are maintained in constant engagement with one another by the pull of a spring $x^2$ (Figs. 1 and 2) which is secured at its ends to the sprocket and shaft $g$ respectively. In order to provide for lateral movement of the negative film the two sprockets $b$ and $c$ on the right hand side of the machine are connected by a yoke $y$ in which they are free to rotate. A nut $y^1$ has its inner end journaled in the yoke $y$ and is screwed on to an extension of the spindle $d^3$ of the right hand pressure block. Thus, by turning the nut $y^1$ the sprockets $b$ and $c$, together with the film carried thereon, are moved sidewise.

$z$ is a lever, eccentrically pivoted on the lever $s$ and bearing on the top edge of the plate $h$, by lifting which lever the front end of the lever $s$ can be depressed for the purpose of separating the pressure blocks should it not be convenient to do this through the medium of the cam $o^2$.

As the printing is preferably done from a wet film on to a dry film, and as celluloid films stretch when wet and shrink when dry, there is consequently a difference in length between the two films—negative and positive. It follows, therefore, that if they were rolled together in contact one film would creep on the other and the negative would soon be completely out of registration with the positive. To obviate this, the films are first placed in register by means of the lateral and vertical adjustment devices above described and so that the image on the negative and the corresponding portion of the picture on the positive are in correct registration along a line at A (Fig. 1), that is, before the two films enter between the pressure blocks. Having registered the two films at A the apparatus is now set in motion, and the following operations, A, B, C, D and E, take place:—

A. The sprockets rotate and in doing so draw the two films down through the pressure blocks for the length of one picture, during which operation the color is transferred from the negative to the positive. By reason of the two films coming together at an angle and meeting at the line A, and owing also to their being drawn from that point in contact with one another and under pressure, the upper edges of the pressure blocks act as a squeegee expelling the air and giving a perfectly even and uniform impression. This operation may require ¾ of a revolution of the handle $n$.

B. The films remain in contact between the pressure blocks for, say, the following 2¼ revolutions of the handle $n$.

C. Pressure blocks separate during, say, the next ½ revolution of the handle $n$.

D. The films re-register. Having previously allowed for the variations in the length of the two films, and this variation being constant, and having also already got the two films in exact registration at A on the previous picture, it follows that when the pressure blocks are separated and the films thereby freed from contact with one another the tension springs already referred to in the two top sprockets $b$, $b$, are free to pull the films taut against the bottom sprockets $c$, $c$, and the films must of necessity again register at A in the same relation to one another as they were on the previous picture.

E. The pressure blocks now close (with the already colored picture between them) and immediately they come together the sprockets $c$, $c$, turn again and draw down the two fresh pictures already registered as described above.

The various operations A–E are then again performed in sequence and repeated throughout the length of the films.

It is very important that, during the backward and forward motion of the pressure blocks, there should be no slipping or movement of the films relatively to them, because this would be likely to throw the films out of registration with one another. If the pressure blocks were formed integrally with or were fixed to the swinging frames $a$, $a$, the distance between any given point on the lower edge of the pressure blocks $d$, $d$, and the point at which the films are tangential to the lower sprockets would constantly increase as the pressure blocks receded from one another, with the result that the films would be constantly slipping over the pressure blocks during the whole of the time that the latter opening and closing, seeing that the lower sprockets remain stationary during the opening of the pressure blocks. Consequently, upon the pressure blocks coming forward again the films would have to pass upward (back) over the pressure blocks and there would, therefore, be friction, and further, owing to the fact that the backs of the films are not absolutely in contact with the pressure blocks, the films would touch before the pressure blocks were quite home and thereby be prevented from registering independently when once they had touched. If the pressure blocks were integral with the frames $a$, $a$, their lower edge would move along the curved path B, with the result that the pressure blocks would slide upward and downward along the film. Now, by means of the controlling arms $d^1$, fixed to the rear of the pressure blocks, and the arms $d^2$ pivoted to the arms $d^1$, at $d^*$ and arranged to rock on the stationary pivots $w$, the pressure blocks are caused to swing on their pivots $d^3$ in such a way that their lower edges move along the paths C, whereby, during the time that the pressure blocks recede and until they come forward again into contact with one another, slipping or movement of the films thereon is prevented. In this way absolute registration of the films is maintained, subject, of course, to any adjustment that may have to be made to compensate for their unequal shrinkage, expansion or other deformation.

I claim:—

1. In apparatus for transferring color from a negative film to a positive film, rocking-frames, means about which said rocking-frames rock, means for rocking said frames, pressure blocks on said rocking-frames, and distinct sets of film-carrying sprockets on said rocking-frames.

2. In apparatus for transferring color from a negative film to a positive film, rocking-frames, means about which said rocking-frames rock, means for rocking said frames, pressure blocks on said rocking-frames, means on said rocking-frames for carrying the films and means for adjusting the films independently of one another so as to bring them into registration.

3. Apparatus for transferring color from a negative film or the like to a positive film comprising pressure blocks between which the films are placed, means for carrying the films, means for enabling the films to be adjusted independently of one another so as to bring them into registration, and means for drawing the films, in correct registration and with a squeegeeing action, through the pressure blocks.

4. In apparatus for transferring color from a negative film to a positive film, rocking-frames, means about which said rocking-frames rock, means for rocking said frames, pressure blocks on said rocking-frames, means on said rocking-frames for carrying the films, and means for preventing movement of the films on the pressure blocks during the rocking motion of said rocking-frames.

In witness whereof I have hereunto set my hand in the presence of two witnesses.

PERCIVAL E. STOW.

Witnesses:
H. T. P. GEE,
HERBERT D. JAMESON.